United States Patent [19]

Monsimer et al.

[11] 4,293,454
[45] Oct. 6, 1981

[54] PROCESS FOR REACTING CHLORAL WITH NITROGEN COMPOSITIONS

[75] Inventors: Harold G. Monsimer, East Norriton; Stanley R. Sandler, Springfield, both of Pa.

[73] Assignee: Pennwalt Corporation, Philadelphia, Pa.

[21] Appl. No.: 118,297

[22] Filed: Feb. 4, 1980

[51] Int. Cl.³ .................. C09K 3/28; C07C 127/15; C07C 127/22; C07C 143/72; C07C 157/05; C07C 157/12; C08J 9/00
[52] U.S. Cl. .................. 252/609; 521/163; 521/164; 564/30; 564/60; 564/61; 564/79
[58] Field of Search ........ 260/552 R, 553 E, 556 SN; 252/609; 521/164, 163; 564/30, 60, 61, 79

[56] References Cited

U.S. PATENT DOCUMENTS

| | | | |
|---|---|---|---|
| 3,903,154 | 9/1975 | Singer | 564/60 |
| 4,111,683 | 9/1978 | Singer | 564/60 |
| 4,152,497 | 5/1979 | Miano et al. | 521/164 |

FOREIGN PATENT DOCUMENTS 131646 7/1978 German Democratic Rep. .................. 252/609

*Primary Examiner*—Teddy S. Gron

[57] ABSTRACT

A flame retardant composition is prepared by reacting chloral with a nitrogen compound having the formula:

$$R_1-N-X-N-R_3 \quad (I)$$
$$\phantom{R_1-N-}|\phantom{X-N-}|$$
$$\phantom{R_1-N-}R_2\phantom{X-}R_4$$

wherein:

(a) X=

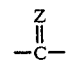

or, $-SO_2-$;

(b) Z is selected from O or S;
(c) $R_1$, $R_2$, $R_3$ and $R_4$ are selected from the group consisting of H, alkyl of 1 to 6 carbons, and substituted or unsubstituted hydroxyalkyl of 2 to 4 carbons and mixtures thereof in a temperature range of 25° to 100° C., in the absence of a solvent and in an apparatus that provides efficient mixing. These compositions are useful for preparing flame retardant polyurethane foams.

6 Claims, No Drawings

PROCESS FOR REACTING CHLORAL WITH NITROGEN COMPOSITIONS

BACKGROUND OF THE INVENTION

1. Field of the Invention

This invention relates to a process for reacting chloral with nitrogen compositions.

2. Description of the Prior Art

U.S. Pat. No. 4,152,497 discloses that certain reaction products of chloral with urea, thiourea, or sulfamide are useful as reactive flame retardants for polyurethane foams. The disclosed solid mono or dichloral urea compositions have the disadvantage of being prepared in water or tetrahydrofuran. In the case where these products are prepared in water, they must be filtered, dried and redissolved in the polyol before being used in the preparation of polyurethane foam. The acid catalyst used in their preparation also has to be removed by washing and this process step results in a disposal problem because a large volume of highly acidic wash water is generated. Another problem with these solid products is that substantially all the water has to be removed prior to dissolving them in the polyurethane polyols since it interferes with the foaming reaction. This necessitates a lengthy drying period. When tetrahydrofuran is used as the solvent, it has to be removed by distillation in order to isolate the product. This also creates a disposal problem. In addition, tetrahydrofuran is flammable and dangerous to handle in plant equipment making this process undesirable commercially.

Copending application Ser. No. 064,656 discloses flame retardant chloral urea compositions more conveniently prepared directly in an anhydrous polyol solution which comprises 20–95% of the total. In this disclosed process there is no need for filtration, washing or drying of the products prior to using them in the manufacture of polyurethane foams. This process has the disadvantage of not producing 100% active flame retardant.

East German Pat. No. 131,646 described a solventless process for preparing dichloralurea by the reaction of urea with technical chloral hydrate. This process as in the case of U.S. Pat. No. 4,152,497 has the disadvantage in that the product contains aqueous hydrochloric acid and must be thoroughly washed and dried before use in preparing polyurethane foam. If washing is omitted and the product only dried then the residual hydrochloric acid would interfere in the polyurethane foaming reaction since it would react and consume the necessary amine catalysts.

The present invention overcomes the disadvantages of the prior art by providing a process for preparing a 100% active product wherein urea and substituted ureas are reacted with anhydrous chloral in the absence of both solvents and acid catalysts. This invention also avoids the costly and time consuming washing and drying operations of the prior-art processes. In addition, since the reaction product contains no unreacted starting materials recovery or disposal operations are not required in the process of this invention; it is thus more economical.

STATEMENT OF THE INVENTION

The present invention is directed to a process for preparing an anhydrous flame retardant composition comprising reacting 0.5 to 4.0 moles of chloral with 0.5 to 2.0 moles of a nitrogen compound having the formula:

$$R_1-N-X-N-R_3 \quad (I)$$
$$\phantom{R_1-N-}|\phantom{X-N-}|$$
$$\phantom{R_1-N-}R_2\phantom{X-}R_4$$

wherein:

(a) X =

or, $-SO_2-$ (b) Z is selected from O or S;

(c) $R_1$, $R_2$, $R_3$ and $R_4$ are independently selected from the group consisting of H, alkyl of 1 to 6 carbons, and substituted or unsubstituted hydroxyalkyl of 2 to 4 carbons and mixtures in a temperature range of 25° to 100° C. with efficient mixing in the absence of a solvent.

DEFINITIONS

More particularly the present process involves reacting urea, thiourea, sulfamide, alkylureas or substituted alkyl and alkanol ureas and mixtures thereof with chloral at 25°–100° C., preferably at 60°–90° C., in the absence of solvents and in an apparatus that provides efficient mixing. Examples of suitable equipment that provide efficient mixing, blending, and kneading, are the Readco Double Arm Mixers which have motors which provide horsepower of ⅓ to 100, have an arm RPM of 17 to 68 and a working capacity of 1 quart to 400 gallons. Other suitable equipment that can be used are those that provide high torque for mixing or stirring. Some examples of this equipment are the Readco Continuous Processor, the Baker Perkins (made by Baker Perkins Inc., Saginaw, MI 48601) B-P KO-Kneader for continuous mixing operations, the B-P Batch Mixers and others as described in the "Chemical Engineering Catalog" 54th Ed. Reinhold Publishing Corp. 1970. The later mixers can be equipped with either Sigma, Dispersion, MWol or Single Curve mixing blades. For example, the reaction of urea with chloral goes through a very viscous paste stage, poor mixing leads to a slower reaction that requires several days to reach almost complete conversion. Removal of the product too early leads to isolation of large amounts of unreacted chloral. The latter causes a disposal problem and in the case of urea, monochloral urea is formed and this is not as desirable as a flame retardant for polyurethane foam as dichloral urea since it may cause undesirable scorching reactions to take place in the foam. The efficient mixing of the present process also allows the solid products to be isolated as a free-flowing powder ready for use. In the prior-art process for making a solid product, the product had to be chipped out of the reactor making the process uneconomical.

The products of the present invention require no further purification in order to be used for flame retarding polyurethane foam. Additional purification by recrystallization has indicated that in the case of urea a small quantity of an isomer is present whose elemental analyses, nmr, solution ir, and molecular weight are identical to dichloral urea with the exception that its infrared spectrum as a nujol mull has its carbonyl band slightly shifted to 5.95u.

The process of the present invention is also applicable to such nitrogen compositions as thiourea, alkyl, substituted alkyl and alkanol derivatives of urea such as dimethylurea, dipropanolurea, propanolurea, diethanolurea, ethanolurea, sulfamide and mixtures thereof.

The compositions of this invention are useful in preparing flame retarded polyurethane foam and can be added in the amount of up to 100 percent of the total polyol. The preferred level of the flame retardant composition for high-resiliency polyurethane foam is 1 to 15 parts per hundred parts polyol and for rigid polyurethane foam the preferred range of the flame retardant is 10 to 100 percent of the total polyol. When the flame retardant is 100 percent of the total polyol, it is the sole polyol.

The flame retardant composition of this invention is blended directly with all the standard components used in preparing polyurethane foam; it is also added when optional additives such as stabilizers, plasticizers, pigments, antioxidants, flame retardants, smoke suppressants, etc. are incorporated in the foam.

EXAMPLES

Polyurethane foams described in the following examples are made by the use of the disclosed flame retardant compositions with the use of polyols followed by the addition of catalysts, surfactant, blowing agent (optional) and isocyanate. The components in the foams in the examples are in the measure-units of parts by weight unless otherwise indicated or a non-measure unit item such as an index. This mixture is stirred by a high-speed mixer and is poured into a mold. (In the case of high-resiliency foam the mold is clamped shut.) After the reaction is completed, the foam is removed and aged at room temperature for at least seven days (conventional "hot cure" foams are cured at 100° C. for ½ hour prior to aging). The flame retardant properties are evaluated using ASTM D-1692-74, ASTM D-2863-74, and ASTM STP 422, ASTM E-662 (NFPA 258-T).

The following Examples illustrate the invention and are not to be taken as a limitation thereof.

EXAMPLE 1

Preparation of Dichloral Urea

[Bis(2,2,2-trichloro-1-hydroxyethyl)urea]

To a water jacketed Readco Double Arm Mixer there was added 120.0 g (2.0 moles) of urea which was heated by means of circulating water at 70° C. Then 590 g (4.0 moles) of chloral were added in about 5 minutes. Mixing was continued for a total of 3 hours during which time the temperature of the water bath was slowly allowed to drop to 25°–30° C. The resulting fine white powder was removed from the reactor to give 694 g (98%) of product (m. p. 176°–180° C.).

Anal. Calcd. for $C_5H_6Cl_6N_2O_3$: C, 16.92; H, 1.70; Cl, 59.9; N, 7.89; Mol. Wt. 354.8. Found: C, 17.8; H, 1.98; Cl, 58.0; N, 8.31; Mol. Wt. 347 (ethanol).

This material differed from a sample of dichloral urea bis(2,2,2-trichloro-1-hydroxyethyl) urea prepared by the process disclosed in U.S. Pat. No. 4,152,497 in that its infrared spectrum in a nujol mull showed an additional band at 5.95u. The spectrum also differed from the material prepared in the patent without good mixing (our Example 3) in that the above compound infrared spectrum showed no band at 8.69u which is typical of monochloral urea [2,2,2-trichloro-1-hydroxyethyl urea] impurity.

EXAMPLE 2

Isolation of an Isomer of Dichloral Urea

[Bis(2,2,2-trichloro-1-hydroxyethyl)Urea]

A sample of the composition of Example 1 was crystallized from methanol-water to give an approximately 60% recovery of bis(2,2,2-trichloro-1-hydroxyethyl)urea. The filtrates from this crystallization were further concentrated to yield approximately 25% recovery of a second material, mp 160°–163° C. The latter material accounts for the second carbonyl-band (5.95u) in the material from Example 1. The elemental analysis, nmr spectrum, and solution infrared spectrum in p-dioxane of the latter material is also consistent for a structure identical to dichloral urea [bis(2,2,2-trichloro-1-hydroxyethyl)urea].

Anal. Calcd. for $C_5H_6C_6N_2O_3$: C, 16.92; H, 1.70; Cl, 59.9; N, 7.89; Mol. Wt. 354.8. Found: C, 17.5; H, 2.02; Cl, 57.7; N, 8.01; Mol. Wt. 361 (ethanol).

EXAMPLE 3

Reaction of Chloral with Urea without Efficient Mixing

A mixture of 300 g (2.04 moles) of chloral and 60 g (1.00 mole) of urea was heated to 70° C. using typical laboratory mechanical stirrer (Heller Corp., Model GT-21) with stirring. An exothermic reaction occurred and cooling was necessary to maintain the temperature below 100° C. at which point chloral began to reflux. After 15-20 minutes the reaction solidified and further stirring was impossible. The resulting solid was removed from the flask by laborious chipping and with considerable mechanical loss to give 307 g (85% yield) product, mp 184°–186° C. This product was estimated to contain approx. 30% mono chloral urea[2,2,2-trichloro-1-hydroxyethylurea] impurity as calculated from the infrared band at 8.69u.

EXAMPLES 4–8

These Examples illustrate that the composition of this invention as used in Examples 5 and 6 gives physical property and flame retardant results essentially the same as that obtained by a similar material used in Examples 7 and 8 and prepared by the less economical process as disclosed in U.S. Pat. No. 4,152,497.

| Formulation | RESULTS | | | | |
| --- | --- | --- | --- | --- | --- |
| | Example 4 Control | Examples 5-6 (Using Composition of Example 1) | | Examples 7-8 (Using Composition of U.S. Pat. No. 4,152,497) | |
| | | Ex. 5 | Ex. 6 | Ex. 7 | Ex. 8 |
| Composition | | | | | |
| Voronal 4701 (Dow) | 60 | 60 | 60 | 60 | 60 |
| Niax 34-28 (Union Carbide) | 40 | 40 | 40 | 40 | 40 |
| Composition of Ex. 1 | — | 1 | 3 | — | — |
| Composition of U.S. Pat. No. 4,152,497 | — | — | — | 1 | 3 |
| Water | 2.7 | 2.7 | 2.7 | 2.7 | 2.7 |
| Silicone Surfactant DCF 1-1630 (Dow Corning) | 0.04 | 0.04 | 0.04 | 0.04 | 0.04 |
| Diethanolamine | 1.5 | 1.5 | 1.5 | 1.5 | 1.5 |
| Dabco 33L Catalyst (Air Products) | 0.3 | 0.3 | 0.3 | 0.3 | 0.3 |
| Niax A-1 Catalyst (Union Carbide) | 0.12 | 0.12 | 0.12 | 0.12 | 0.12 |
| Niax A-4 Catalyst (Union Carbide) | 0.3 | 0.3 | 0.3 | 0.3 | 0.3 |

RESULTS -continued

| Formulation | Example 4 Control | Examples 5-6 (Using Composition of Example 1) | | Examples 7-8 (Using Composition of U.S. Pat. No. 4,152,497) | |
| --- | --- | --- | --- | --- | --- |
| | | Ex. 5 | Ex. 6 | Ex. 7 | Ex. 8 |
| T-12 Catalyst (M&T) | 0.03 | 0.03 | 0.03 | 0.03 | 0.03 |
| Toluene diisocyanate (80/20 mixture of 2,4/2,6 isomers) (Olin) | 36.8 | 37.3 | 36.5 | 37.3 | 36.5 |
| Isocyanate Index | 105 | 105 | 105 | 105 | 105 |
| Physical Properties | | | | | |
| Density (Core-lb/ft$^3$) | 2.9 | 3.3 | 2.9 | 3.0 | 3.0 |
| ILD | | | | | |
| 25% (lb/50 in$^2$) | 36 | 39 | 34 | 40 | 40 |
| 65% (lb/50 in$^2$) | 89 | 95 | 87 | 99 | 101 |
| Sag Factor | 2.5 | 2.5 | 2.6 | 2.5 | 2.5 |
| Compression Set (%) | | | | | |
| $C_d50$ | 16.6 | 12.9 | 15.4 | 14.1 | 11.1 |
| $C_d75$ | 11.8 | 10.8 | 14.6 | 11.5 | 8.8 |
| $C_d90$ | 11.4 | 10.2 | 12.6 | 12.2 | 7.6 |
| Flame Retardant Properties | | | | | |
| ASTM D-1692 | 4.1 | 1.9 | 1.2 | 1.8 | 1.0 |
| MVSS 302 | pass | pass | pass | pass | pass |

EXAMPLE 9

1,3-Bis(2,2,2-trichloro-1-hydroxyethyl)-1,3-bis(2-hydroxypropyl)urea

A mixture of 38 g (0.63 mole) of urea and 100 g (1.33 mole) of D,L-1-amino-2-propanol was heated at 130°–160° C. for 3 hours to form 1,3-bis(2-hydroxypropyl)urea. Without isolation, the reaction mixture was cooled to 75° C. and 196.4 g (1.33 mole) of chloral was added slowly while the temperature was maintained below 80° C. using external cooling. The reaction mixture was vigorously stirred and heated at 80° C. for 1 hour. On cooling 298 g of a clear viscous syrup product was isolated.

The elemental analysis, infrared and nmr spectra were consistent with the assigned structure of the product.

EXAMPLE 10

1,3-Bis(2,2,2-trichloro-1-hydroxyethyl)-1,3-bis(2-hydroxyethyl)urea 50 g (0.34 mole) of diethanolurea was heated to 45° C.; 101 g (0.69 mole) of chloral was added thereto with cooling to maintain the temperature between 45°–50° C. After the addition was complete, the reaction mixture was vigorously stirred while being warmed at 45°–50° C. for an additional 2 hours. On cooling 130 g of a clear viscous liquid product was isolated.

The elemental analysis, infrared and nmr spectra were consistent with the assigned structure of the product.

EXAMPLE 11

1,3-Bis(2,2,2-trichloro-1-hydroxyethyl)-1,3-bis(2-hydroxyethyl)thiourea

To 98.4 g (0.6 mole) of 1,3-bis(2-hydroxyethyl)-thiourea at 65° C. was slowly added 182 g (1.24 moles) of chloral while the temperature was maintained below 75° C. by means of external cooling. The reaction mixture was vigorously stirred and heated at 80° C. for 1 hour. On cooling 275 g of a viscous syrupy product was isolated.

The elemental analysis, infrared and nmr spectra were consistent with the assigned structure of the product.

EXAMPLE 12

1,3-Bis(2,2,2-trichloro-1-hydroxyethyl)-1-hexylurea

A mixture of 6.0 g (0.1 mole) of urea and 11.1 g (0.11 mole) of n-hexylamine was heated at 130°–135° C. for 4 hours to form monohexylurea. Without isolation, the reaction mixture was cooled to 70° C., and 31.0 g (0.21 mole) of chloral was slowly added while the temperature was maintained below 80° C. using external cooling. The reaction mixture was vigorously stirred and heated at 80°–85° C. for 1 hour. On cooling 43.9 g of a viscous syrupy product was isolated.

The elemental analysis, infrared and nmr spectra were consistent with the assigned structure of the product.

EXAMPLE 13

1,3-Bis(2,2,2-trichloro-1-hydroxyethyl)-1-hydroxybutylurea

A mixture of 6.0 g (0.1 mole) of urea and 9.8 g (0.11 mole) of 4-amino-1-butanol was heated at 130°–135° C. for 4 hours to form monohydroxybutylurea. Without isolation the reaction mixture was cooled to 70° C. and then 31.0 g (0.21 mole) of chloral was slowly added while the temperature was maintained below 80° C. using external cooling. The reaction mixture was vigorously stirred and heated at 80°–85° C. for 1 hour. On cooling 43 g of a viscous syrupy product was isolated.

The elemental analysis, infrared and nmr spectra were consistent with the structure of the product.

We claim:

1. A process for preparing an anhydrous flame retardant composition comprising reacting 0.5 to 4 moles of chloral with 0.5 to 2.0 moles of a nitrogen compound having the formula:

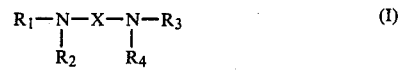

wherein:

(a) X=

or, —SO$_2$—;

(b) Z is selected from O or S;

(c) R$_1$, R$_2$, R$_3$ and R$_4$ are independently selected from the group consisting of H, alkyl of 1 to 6 carbons, and substituted or unsubstituted hydroxyalkyl of 2 to 4 carbons and mixtures thereof in a temperature range of 25° to 100° C. with efficient mixing in the absence of a catalyst and of a solvent.

2. The process of claim 1 wherein the nitrogen compound is selected from the group consisting of urea, diethanolurea, dipropanolurea, thiourea, sulfamide and mixtures thereof.

3. The process of claim 2 wherein 2.0 moles of chloral are reacted with 1.0 mole of urea to produce dichloral urea.

4. The process of claim 3 wherein the temperature is 60° to 75° C. and the efficient mixing is obtained by a mechanical mixer or kneader.

5. The process of claim 2 wherein 2.0 moles of chloral are reacted with 1.0 mole of diethanolurea to produce 1,3-bis(2,2,2-trichloro-1-hydroxyethyl)-1,3-bis(2-hydroxyethyl)urea.

6. The process of claim 2 wherein 2.0 moles of chloral are reacted with 1.0 mole of dipropanolurea to produce 1,3-bis(2,2,2-trichloro-1-hydroxyethyl)-1,3-bis(2-hydroxypropyl)urea.

* * * * *